United States Patent Office 3,139,399
Patented June 30, 1964

3,139,399
PROCESS FOR THE PRODUCTION OF LIQUID
PARAFFIN
Eva-Maria Jahn and Horst Brenken, Hamburg-Wilhelmsburg, Germany, assignors to The British Petroleum Company Limited, London, England, a joint-stock corporation of England
No Drawing. Filed July 20, 1962, Ser. No. 211,444
Claims priority, application Germany Aug. 8, 1961
8 Claims. (Cl. 208—264)

According to the foodstuffs laws in a number of countries, for example the "Order relating to the addition of foreign substances during the treatment of fruits and fruit products" (Fruit Treatment Order) in Germany and the proposal of the American Petroleum Institute in conjunction with new American foodstuffs laws, Liquid Paraffins must:

(a) Be free from fluorescence in ultraviolet light
(b) Maintain a limit of absorption at given UV wavelengths:

| | |
|---|---|
| At 275 nm./1 mm. cell | Below 0.3 |
| At 295–299 nm./1 cm. cell | Below 0.225 |
| At 300–400 nm./1 cm. cell | Below 0.180 |

Qualities of liquid paraffin which satisfy these conditions have hitherto been obtained by refining with oleum but this is subject to disadvantages. These disadvantages are in the main a high oleum consumption (over 50% of the charge oil) a low yield of liquid paraffin (50 to 60%), and the production of large quantities of acid tar, the utilisation of which constitutes a problem and represents a financial burden on the process. Doubts have also frequently been expressed as to whether by means of oleum refining it is, in fact, possible to produce a liquid paraffin which can be guaranteed free from condensed aromatics.

Trials have also been carried out involving the use of gaseous $SO_3$ instead of oleum for the refining of liquid paraffin. However, the disadvantages described for oleum also apply for $SO_3$.

Hydrogenation is another known process and this gives good yields of very light-coloured oils and is therefore very suitable for the production of white oils and liquid paraffin. However, despite their light colour, the hydrogenated oils show a comparatively strong fluorescence, indicating the presence of aromatics, so that these products cannot be used for the purposes mentioned. In order to, overcome this disadvantage a combination treatment has been proposed comprising subjecting the hydrogenated products to treatment with oleum. In this connection, however, it has been found that the strong fluorescence of the hydrogenated products in ultraviolet light disappears only slowly. In comparison with a liquid paraffin which is produced without hydrogenation, the saving of oleum is only about 50%. Again treatment with aluminium chloride, which is also known does not eliminate the fluorescence.

The present invention relates to a new type of combination process for the production of liquid paraffins of the kind which comply with the Foodstuffs Laws. In fact it has surprisingly been found that the troublesome fluorescence in the case of the very light-coloured oils refined by hydrogenation can be removed in a very simple and by economic manner if instead of carrying out the post-refining with oleum this post-refining is carried out with gaseous $SO_3$.

According to the present invention a process for the production of a liquid paraffin which is free from fluorescence in ultraviolet light comprises hydrogenating a crude paraffin feedstock and subsequently treating the hydrogenated product with gaseous $SO_3$. Preferably, prior to the $SO_3$ treatment stage of the process, the hydrogenated oil is activated with a small quantity of acid tar, for example from a previous operation, or with a small quantity of acid, in order to guide the subsequent reaction with $SO_3$ in the direction of sulphonation. It is also preferable that the product treated with $SO_3$ should then be extracted with alcoholic alkali for the purpose of removing the sulphonic acids formed, and that it should then be acidified again with a very small quantity of oleum.

Unexpectedly the combination process involving hydrogenation followed by treatment with gaseous $SO_3$ provides considerably better results than the known combination process of hydrogenation with oleum treatment. It is believed that compounds left behind in traces after the hydrogenation and which are responsible for the fluorescence in ultraviolet light react only slightly with oleum but react very rapidly with gaseous $SO_3$.

The hydrogenation in the first stage of the process according to the invention may be carried out in a known manner at elevated temperatures, elevated pressures and in the presence of catalysts. Particularly suitable ranges are a temperature range from 300 to 400° C., a pressure range from 30 to 120 atmos. using known hydrogenation catalysts of the 5th to 8th Groups of the Periodic Table. The subsequent sulphonation with gaseous $SO_3$ is carried out at low temperatures preferably not exceeding 50° C. For this purpose only comparatively small quantities of $SO_3$ are required, and preferably the operation is carried out with 1 to 10, especially 3 to 5, percent by weight of $SO_3$, reckoned on the hydrogenated oil used. In the process according to the invention this gaseous $SO_3$ is preferably passed into the hydrogenated product in admixture with another gas. Gaseous carriers which can be used are, for example, inert gases such as nitrogen or air. In this connection it is once again preferred to operate with comparatively low concentrations of $SO_3$ in the gas mixture, and for example it is possible to employ $SO_3$ concentrations in the gas mixtures of the order of 10% or less.

In order to start off the reaction between the gaseous $SO_3$ and the troublesome compounds of the hydrogenation product which have to be removed, the above-mentioned activation with small quantities of acid tar, preferably obtained from a previous treatment of the same initial oil, is preferably carried out. It is particularly suitable to use 0.5 to 10 percent weight of this acid tar as an activator. The sulphonated product is preferably treated with 0.5 to 5% of oleum, which preferably contains about 20% of $SO_3$, after extraction with alcoholic alkali.

The final processing of the processed product treated in this way is carried out in a conventional manner, that is to say first of all a separation into layers is carried out in order to remove the acid tar formed following by neutralisation preferably with alcoholic alkali solution and processing with Fuller's earth.

Example

The initial oil used was a Middle East solvent-treated spindle oil. This was first of all refined by a trickle phase hydrogenation process using a catalyst consisting of oxides or sulphides of the 5th to 8th sub-groups of the Periodic Table on aluminium oxide as support, the following conditions being employed.

| | |
|---|---|
| Temperature | 360°. |
| Pressure | 90 atmos. |
| Space velocity | 0.1 vol. oil/vol. catalyst/hour. |
| Gas rate (once through) | 175 vol. residual gas/vol. oil. |

The hydrogenation product was stripped free from $H_2S$ with nitrogen, a loss of 2% being involved.

The activation of this oil was carried out with acid tar from an oleum treatment of the same basic oil. The activated oil was sulphonated with 4% by weight of $SO_3$ in a stream of nitrogen (7% $SO_3$ in the gas stream). This was followed by a neutralisation step in which 3% of sulphonated product was removed from the oil. After drying the final treatment was carried out with 5% oleum, followed by neutralisation with alcoholic alkali solution and final treatment with active earth.

The yield and quality of the oil obtained in this way can be seen from the table below:

| | Conventional process with oleum | Hydrogenation and oleum treatment | Process according to the Invention |
|---|---|---|---|
| (a) Hydrogenation | | 2% stripping loss. | 2% stripping loss. |
| (b) Activation with acid tar | | | No loss. |
| (c) Treatment with 4% $SO_3$ | | | Do. |
| (d) Extraction with alcoholic alkali solution | | | 5% sulphonate. |
| (e) Refining with oleum: | | | |
| Percent by weight | 52 | 22.5 | 3. |
| Percent by weight yield— | | | |
| Acid oil | 74 | 96 | 98.5. |
| Neutral oil | 67 | 95.5 | 96. |
| Finished oil | 64 | 91 | 93. |
| (f) Total yields, reckoned on the initial product in percent by wt.: | | | |
| Finished liquid paraf | 64 | 89 | 86. |
| Sulphonate | 7 | 1.5 | 5. |
| Data: | | | |
| WOMA colour | 1 | 1 | 1. |
| Fluorescence | free | free | free. |
| UV fluorescence | positive | positive | negative. |
| UV absorption— | | | |
| 275 nm./1 mm | 0.150 | 0.002 | 0.005. |
| 295–299 nm./1 mm | 0.159 | 0.004 | 0.009. |
| 300 nm./1 mm | 0.125 | 0.058 | 0.005. |
| Hot acid test— | | | |
| Lovibond yellow | 2.6 | 2.5 | 1.8. |
| Lovibond red | 1.2 | 1.1 | 0.7. |
| d/20 | 0.842 | 0.848 | 0.841. |
| Cst./20° C | 33.5 | 27.1 | 32.4. |

We claim:
1. Process for the production of a liquid paraffin which is free from fluorescence in ultraviolet light comprising hydrogenating a crude paraffin feedstock; activating the hydrogenated oil with from 0.5 to 10 percent by weight of a material selected from the group consisting of sulphuric acid and acid tar; and subsequently treating the activated hydrogenated oil with from 0.5 to 10% by weight of the hydrogenated oil of gaseous $SO_3$ in admixture with an inert carrier gas, at a temperature not exceeding 50° C.

2. Process as claimed in claim 1 wherein the hydrogenated oil is activated with acid tar obtained from a previous operation, prior to treatment with gaseous $SO_3$.

3. Process as claimed in claim 1 wherein the product from the $SO_3$ treatment stage is treated with 0.5–5% of oleum after extraction of the product with alcoholic alkali.

4. Process as claimed in claim 3 wherein the oleum contains about 20% of $SO_3$.

5. Process as claimed in claim 1 wherein 3 to 5% by weight of $SO_3$ is used.

6. Process as claimed in claim 1 wherein the gaseous $SO_3$ is passed into the oil to be treated in admixture with nitrogen as the inert carrier gas, the carrier gas containing not more than 10% of $SO_3$.

7. Process as claimed in claim 1 wherein the hydrogenation is carried out at temperatures from 300 to 400° C., pressures of 30 to 120 atmospheres and in the presence of known hydrogenating catalysts of the 5th to 8th groups of the Periodic Table.

8. Process as claimed in claim 1, wherein the products of the $SO_3$ treatment stage are subjected to a conventional neutralisation processing.

References Cited in the file of this patent

UNITED STATES PATENTS 3,080,436     King et al.     Mar. 5, 1963
3,091,587     Klass et al.     May 28, 1963